United States Patent [19]

Schenke et al.

[11] 4,189,788

[45] Feb. 26, 1980

[54] HEADSET

[75] Inventors: Walter Schenke, Postbauer; Gerhard Krauss, Stein, both of Fed. Rep. of Germany

[73] Assignee: Grundig E.M.V. Elektro-Mechanische Versuchsanstalt, Fuerth, Fed. Rep. of Germany

[21] Appl. No.: 960,187

[22] Filed: Nov. 13, 1978

[30] Foreign Application Priority Data

Mar. 17, 1978 [DE] Fed. Rep. of Germany ... 7808135[U]

[51] Int. Cl.$^2$ .......................... A42B 1/06; H04M 1/05

[52] U.S. Cl. .................................... 2/209; 179/156 R

[58] Field of Search ........... 2/209; 179/156 R, 156 A; 181/129, 137

[56] References Cited

U.S. PATENT DOCUMENTS 2,434,251 1/1948 Warnke ........................... 179/156 R

*Primary Examiner*—George G. Stellar

*Attorney, Agent, or Firm*—Kane, Dalsimer, Kane, Sullivan and Kurucz

[57] ABSTRACT

A headset is provided wherein each ear piece is supported to the headband by means of a support member having a wedge shaped opening therein. A wedge is positioned within the support member opening and the headband is secured to the wedge. The wedge resiliently urges a fork attached to the ear piece against the support member thereby providing a slideable, frictional engagement.

6 Claims, 3 Drawing Figures

HEADSET

BACKGROUND OF THE INVENTION

The present invention relates to headsets and in particular to an adjustable ear piece arrangement for such headsets.

As is well known, a headset usually consists of a pair of ear pieces each containing therein an electroacoustic transducer. The ear pieces are brought into position adjacent the ears of a listener so that acoustic signals generated by the transducers are introduced directly into the listener's ear without ambient noise interference. A headband is provided to hold the ear pieces in position about the head of the listener. Since the size and shape of the listener's head will vary from person to person, it is necessary that the headband be adjustable so that the headset may comfortably be worn by a variety of listeners. Heretofore, a number of different headset constructions have been proposed and are in use to render such headsets adjustable. The prior art headsets, however, are relatively expensive to manufacture and assemble and do not permit smooth sliding adjustment.

In view of the above, it is the principal object of the present invention to provide an improved headset arrangement wherein the ear pieces are adjustably mounted to a headband in a manner which enables smooth size adjustment.

A further object is to provide such a headset which is manufactured of simple structural elements and can be assembled relatively easily and inexpensively.

A still further object is to provide a headset wherein adjustability is provided without the use of additional fastening means such as screws, rivets, etc.

Still further objects will be apparent from a review of the following disclosure.

SUMMARY OF THE INVENTION

In accordance with the present invention, the above and other beneficial objects and advantages are attained by providing a headset comprising a headband, a pair of ear pieces one at each end of the headband and a pair of fork members each having one end secured to one of the ear pieces and a shank portion extending away from the end and adapted to be coupled to the headband. Coupling is effected through the use of a hollow support jacket having a tapering opening therein. The opening extends from top to bottom of the jacket having a wide top end and narrow bottom end. The headset band and fork shank are disposed along opposite sides of the opening. A wedge member extends into the opening from the wide mouth end positioned between the fork shank and headband portions. The wedge resiliently engages the headband and shank portion urging them toward opposite surfaces. The wedge is arrested in position within the jacket and an end of the headband is secured to the wedge. The wedge serves to provide sufficient frictional force against the shank to hold it secure in a preselected position while permitting a sliding adjustment of the position.

BRIEF DESCRIPTION OF THE DRAWINGS

The present invention is illustrated in the accompanying drawings wherein.

DETAILED DESCRIPTION OF THE PREFERRED EMBODIMENT

Figure 1:
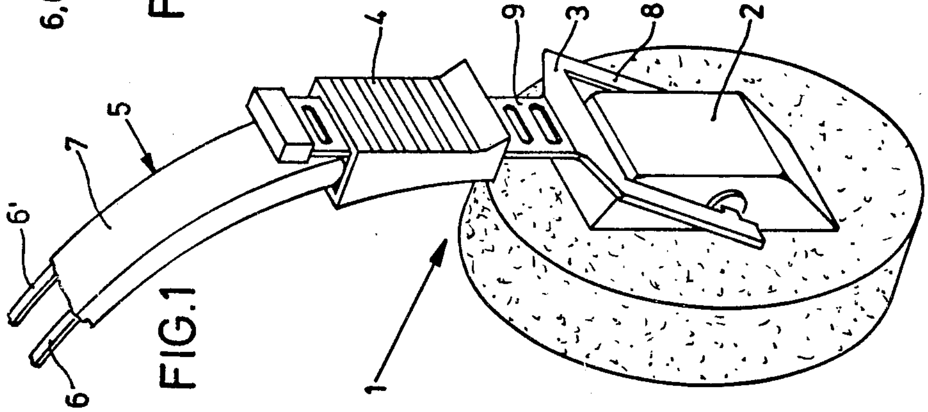
FIG. 1 is a fragmentary perspective view of one-half of a headset in accordance with the present invention.

Reference is now made to the drawings and to FIG. 1 in particular wherein one-half of a headset 1 is depicted. The non-depicted other half of the headset is a mirror image of that shown. Headset 1 consists of a pair of ear pieces 2, each pivotally mounted to the inwardly directed ends of fork member 3. Fork member 3 is secured to a headband 5 through a plastic support member 4.

Headband 5 consists of two spaced resilient bands 6 and 6′ covered by a suitable elastic covering 7. Fork member 3 comprises a sheet metal stamping defining a pair of spaced fork elements 8 and a shank portion 9. The ear piece 2 is pivoted to the inwardly turned end portions of the fork elements 8. The ear pieces may be mounted within a foam ring or the like so that they may be comfortably worn about the ear of a listener. Electrical connections (not shown) are provided for the ear pieces.

The shank portion 9 of each fork member is slideably mounted within an opening in plastic support member 4. The headset 1 is adjustable to the shape of the head of an individual by virtue of the slideable mounting between headband 5 and the ear piece supporting fork 3 by virtue of the plastic support member 4 as will be described.

Figure 3:
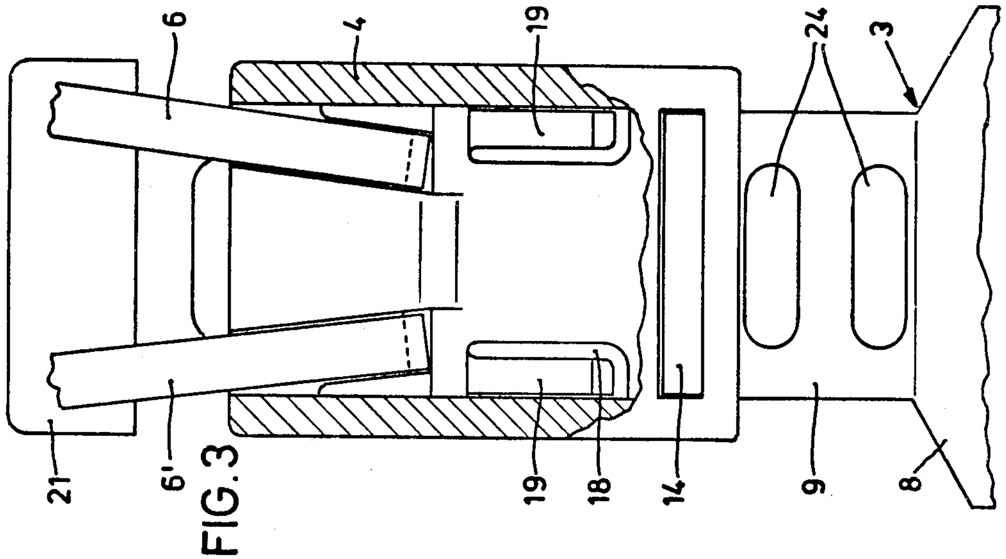
Figure 2:
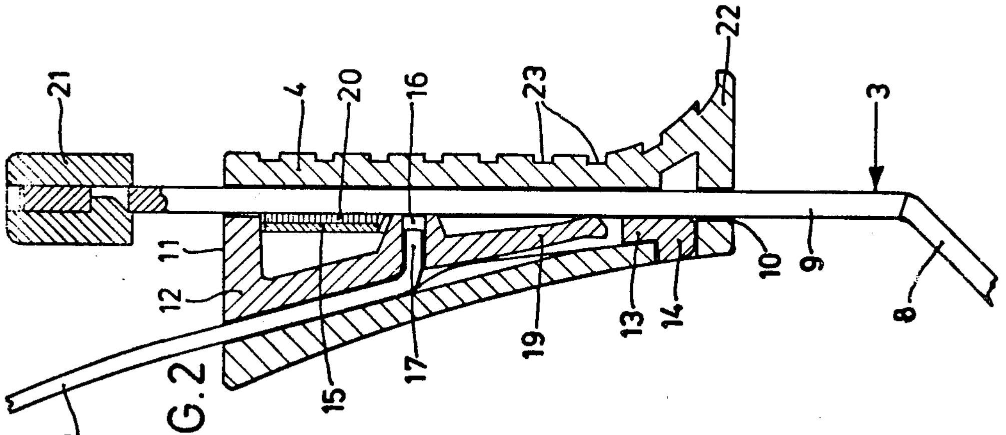
FIG. 2 is an enlarged side elevational sectional view of the adjusting means between the headband and ear piece; and, FIG. 3 is a fragmentary plan view, partially in section, of the adjustment means of FIG. 2.

Details of the plastic support member 4 are depicted in FIGS. 2 and 3. The assembly of the slideable coupling between the fork portion 3 and the resilient band 6 and 6′ is shown in FIG. 2. The plastic support member 4 comprises a generally rectangular jacket having a hollowed out center portion. The hollow space is a wedge shaped opening terminating at the lower end of the plastic jacket in a slot-like opening 10 the dimensions of which closely conform to the dimensions of the shank 9 of fork member 3 while permitting the shank to pass therethrough. The hollow opening widens toward the top end of member 4 providing an expanded wide mouth opening 11 at the upper end of member 4.

A wedge-shape clamping member 12 is inserted in the hollow space extending downwardly from the top opening 11. The lower end 13 of clamping member 12 is provided with an inwardly (i.e., directed toward the head of a wearer) turned shoulder 14 which defines a hook that extends across the entire width of the lower end 13 of wedge 12. A slot is provided across the width of the lower end of plastic member 4 to receive the hook defined by shoulder 14 as shown in FIGS. 2 and 3 and thereby arrest the wedge in position. Since the wedge and jacket are formed of plastic they will deform while the wedge is inserted into the jacket and then snap into position.

The upper end of wedge 12 is provided with two support faces 15 on the outer surface thereof. Only one such face is shown in the sectional view of FIG. 2. A pair of perforations 16 are provided on the inner surface of the wedge below the support surfaces 15. The lower ends of band 6 and 6′ are turned outwardly to define lips 17 which are captured within the perforations 16. The inner surface of wedge 12 is also provided with a pair of resilient ribs 19. The ribs are formed by cutting the material 18 forming the inner surface of the wedge. When assembled, the shank portion 9 of fork 3 is inserted within the hollow opening between the plastic support member 4 and wedge 12 with the ribs 19 pressing against the shank 9 urging the shank toward the outer surface of the jacket as shown in FIG. 2. The headband is locked in position by virtue of lip 17 being captured within perforation 16 and also the headband being contained between the inner faces of the wedge and jacket. Small pieces of felt or similar material are bonded to the supporting surfaces 15 to provide a frictional slideable engagement between the fork shank and wedge. This engagement permits the shank to hold in any selected position. However, the frictional engagement may be overcome to slide the shank to a new position as desired.

In order to prevent the accidental removal of fork member 3 from the plastic support 4, a cap 21 is provided on the free end of the shank. To facilitate handling of the headset, particularly during adjustment of the ear piece position, the lower end of the plastic support 4 is provided with an outwardly protruding ledge 22 and transversely extending grooves 23 are provided along the entire length of the outer surface of support member 4.

As shown in FIG. 3, the fork shank is provided with perforations 24 so that clamping occurs only at the outer portions of the shank 9.

Thus, in accordance with the above, the aforementioned objects are effectively attained.

Having thus described the invention, what is claimed is:

1. A headset comprising: a headband, a pair of ear pieces one at each end of said band, a pair of fork members each having one end secured to one of said ear pieces and a shank portion extending away from said one end, and means for coupling each of said fork member shank portions to one end of said headband, said last mentioned means comprising a support member having an upwardly tapering opening passing therethrough, said tapering opening terminating in a slot at the lower end of said support member and terminating in a wide mouth at the upper end of said support member, said fork member shank and portions of said headband extending into said opening, and a wedge member extending into said opening from said wide mouth between said shank and said headband portion and engaging and resiliently urging said shank and headband portions toward opposite surfaces of said support member defining said opening.

2. The headset in accordance with claim 1 further comprising means for arresting said wedge in position within said opening.

3. The headset in accordance with claim 2 wherein said wedge includes an integral hook shaped deflection and one of said support member opposite surfaces contains therein a slot for receiving said hook and arresting said wedge in position within said support member.

4. The headset in accordance with claims 1, 2 or 3 wherein said wedge member has opposed surfaces, one surface engaging said headband portion and the other surface engaging said shank portion, said one surface includes a perforation therein and said headband portion is hooked to engage and be captured by said perforation.

5. The headset in accordance with claims 1, 2 or 3 wherein the surface of said wedge engaging said shank is provided with means thereon for slidingly, frictionally engaging said shank.

6. The headset in accordance with claim 4 wherein the surface of said wedge engaging said shank is provided with means thereon for slidingly engaging said shank.

* * * * *